PHONOGRAPH CARTRIDGE RETRACTION MEANS

Filed April 13, 1966 4 Sheets-Sheet 1

INVENTOR.
JEROME F. COLLINS
BY
OSTROLENK, FABER, GERB & SOFFEN
ATTORNEYS

INVENTOR.
JEROME F. COLLINS
BY
OSTROLENK, FABER, GERB & SOFFEN
ATTORNEYS

PHONOGRAPH CARTRIDGE RETRACTION MEANS

INVENTOR.
JEROME F. COLLINS
BY
OSTROLENK, FABER, GERB & SOFFEN
ATTORNEYS

PHONOGRAPH CARTRIDGE RETRACTION MEANS

Filed April 13, 1966 4 Sheets-Sheet 4

INVENTOR.
JEROME F. COLLINS

BY

OSTROLENK, FABER, GERB & SOFFEN
ATTORNEYS

United States Patent Office
3,475,032
Patented Oct. 28, 1969

3,475,032
PHONOGRAPH CARTRIDGE RETRACTION MEANS

Jerome F. Collins, Westbury, N.Y., assignor to Sonotone Corporation, Elmsford, N.Y., a corporation of New York Filed Apr. 13, 1966, Ser. No. 542,289
Int. Cl. G11b 3/02
U.S. Cl. 274—24 2 Claims

ABSTRACT OF THE DISCLOSURE

A phonograph cartridge is carried in a tone arm by a retraction mechanism which successively pivots the cartridge with its stylus through two successive retraction angles about first and second pivot axes when the excessive tone arm depressing forces bring a protective abutment member in contact with the record. The retraction mechanism has a first support member affixed to the cartridge and an overlying cooperating second support member, affixed to the tone arm having the first transverse pivot axis and a second pivot about which the cartridge is successively tilted to its retracted position. The cartridge-affixed first support member has a guide projection extending toward the tone arm. The first pivot axis of the other support member engages the junction between this guide projection and its support member while the cartridge is held in the playing position and while tilting through the first retraction angle. This first pivot axis slides on this guide projection to a raised position after tilting the cartridge through the first retraction angle.

This invention relates to a phonograph record player cartridge retraction means and, more particularly, to a phonograph cartridge retraction means which retracts a cartridge by successively pivoting it about a plurality of pivot points or axes.

A phonograph cartridge has a stylus which engages and transmits the groove undulations of a phonograph record to its transducer elements for inducing therein a corresponding electric signal output. It is desirable to protect the record against damage by excessive stylus pressure transmitted by abnormal depressing forces applied to the cartridge by the superposed tone arm.

In the past, as protection against such record damage, the cartridge has been pivotally supported on the tone arm and biased, as by elastic spring elements, to a normal groove engaging stylus position and thereby secured pivoting of the cartridge under abnormal tone-arm depressing forces to a retracted cartridge position with the stylus retracted from the record by a desired stylus-to-record retraction spacing. In such prior systems, an abutment projection of the cartridge is moved from a normally retracted to a record engaging position under the abnormal tone-arm depressing forces for pivoting the cartridge to its retracted position and thereby lifting the stylus to the minimum stylus-to-record retraction spacing. As examples, such prior cartridges are described in U.S. Patents 2,582,948, 2,569,305 and 2,475,785; also, 3,074,726 and 3,173,692, the disclosures of which are relied upon herein for sake of brevity.

Because of the required limited dimensions of cartridge and tone arm, the stylus-to-record spacing (or "stylus spacing" for short) is also very limited. Accordingly, the securing of a positive and definite minimum stylus-to-record spacing with heretofore known cartridge retraction mechanisms presented critical problems. A commercial cartridge of such known type required an abutment formed of a resilient threaded screw of suitable plastic substance having at its exposed end a square head with a convex end surface for enabling individual adjustment of the screw within a threaded hole of each finished cartridge to an individual abutment height which will provide the required minimum retracted stylus-to-record spacing.

As used herein in the specification and claims, the expression "tone arm" means conventional single-piece tone arms and also tone arms composed of two or more tone-arm sections.

The present invention obtains a maximum of cartridge and stylus lift-off from the record without the necessity for a very precise individual adjustment of the abutment member height or for a large tone-arm height. The concept of the present invention is to provide phonograph cartridge retraction means which, in response to tone-arm depression is actuated by a record engageable abutment to cause the stylus and cartridge to rotate or tilt through a first retraction angle about a first support pivot axis. Continuing tone-arm depression causes the cartridge to be rotated through a second retraction angle about a second support pivot axis due to the juxtaposition of interference edges and/or surfaces of the mating parts of the retraction means. The first pivot axis mating parts of the retraction means now separate as rotation about the second support pivot axis proceeds.

The cartridge has an abutment member with a smooth abutment surface which is too broad to permit it to enter any record grooves upon its engagement with the record surface. The abutment is positioned in front of both the first and the second support-pivot axes and it is nearer to the second support axis.

For a given amount of tone-arm depression, the ratio of the angular cartridge retracting motion about the nearer second pivot to that about the remoter first pivot axis corresponds to the ratio of the distance of the abutment axis from the remoter first pivot axis to its distance from the nearer second pivot axis. Accordingly, when the cartridge is additionally pivoted by the abutment on the nearby second pivot, even a small tone-arm depressing motion causes the cartridge stylus to be retracted from the record surface by larger stylus-to-record spacing than achievable by any prior cartridge retracting mechanisms. As a result, the double-pivot axes cartridge retracting mechanism of the present invention does not require an abutment screw which has to be individually set on each manufactured cartridge. Instead, all cartridges may be manufactured with abutment members of the one required height while assuring that the abutment motion will retract each cartridge by a sufficient angle which assures sufficiently great predetermined stylus-to-record retracted spacing. Thus, the invention eliminates the need for individual adjustments of the abutment height on each cartridge.

As compared with a single pivot cartridge mounting support, a double pivot cartridge support based on the instant invention assured additional cartridge retracting rotation of about 10° with no increase of bracket mounting height. This is a material increase over the angle obtainable with prior single pivot cartridge retracting supports.

It is a primary object of the present invention to provide a record player cartridge retraction means which permits optimum lift-off of the record playing stylus by increasing the angle through which the cartridge rotates while permitting the cartridge mounting bracket to be of a minimal height.

It is another object of the present invention to provide a record player cartridge retraction means having a record surface abutment member which does not require precise height adjustment during the cartridge manufacturing and installing processes.

It is a further object of the present invention to provide a record player cartridge retraction means which accomplishes the aforementioned objects by employing a plurality of pivot points with not more parts than used heretofore.

These and other objects of the present invention will become apparent from the following description of an example of the invention when taken in conjunction with the drawings, in which.

Figure 1:
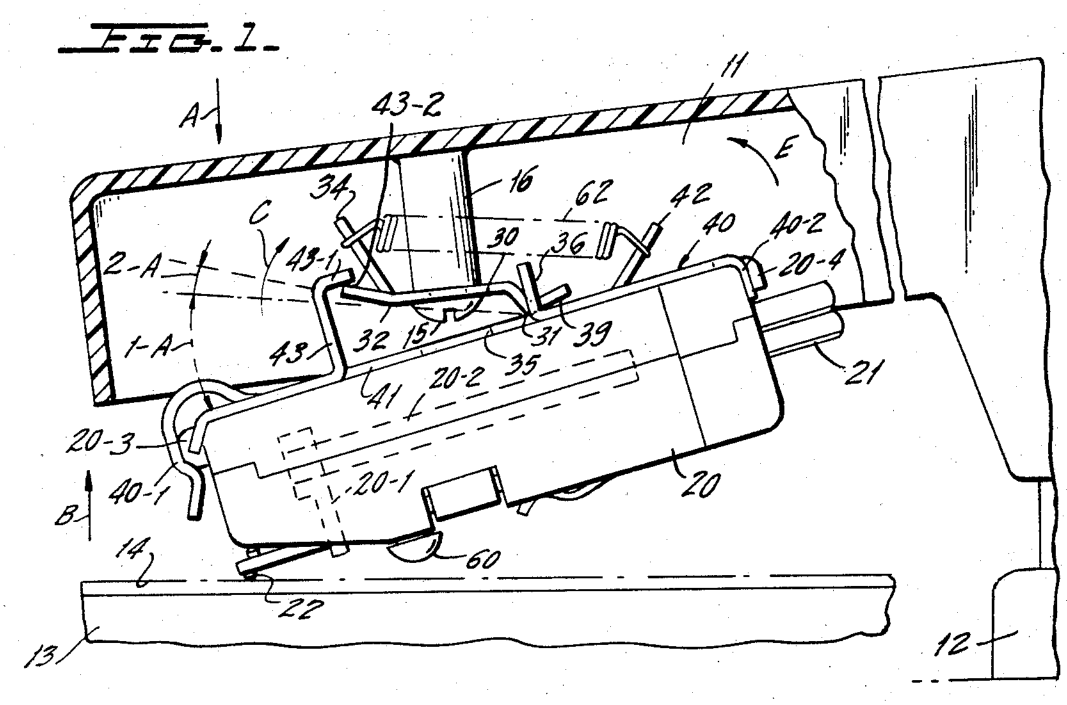
FIG. 1 is a cross-section of a phonograph tone arm containing a cartridge having one example of a retraction means of the instant invention and showing the cartridge in its normal operating or record playing position.

Refer to the example of the invention shown in FIGS. 1 to 3 and 9. Tone arm 11 of a conventional phonograph, shown in partial cross-section, has a rear end pivotally mounted on platform 12 of a phonograph (not shown) around a vertical axis which permits it to be moved to different positions on the record 14. Tone arm 11 has also a conventional horizontal pivot axis which permits the tone arm to be raised from and lowered to the surface of record 14. Atop the rotating phonograph turntable 13 sits a conventional grooved phonograph record 14.

A known type of phonograph pickup cartridge 20 is carried on the opposite or front end of tone arm 11. The cartridge may be of any known type and have, for instance, electromagnetic or piezoelectric or piezoresistive transducer means driven by its groove-engaging stylus 22 for developing an electric signal output corresponding to the groove undulations. For example, the cartridge 20 may be of the type described in U.S. Patent 3,226,956 having two piezoelectric transducers driven by a stylus of a readily replaceable stylus holder and is similar to that of application Ser. No. 435,300, filed Feb. 25, 1965 by J. F. Collins, now U.S. Patent No. 3,392,358, except that it operates with two piezoelectric instead of piezoresistive transducers and the disclosures of which are relied upon herein for sake of brevity.

Figure 2:
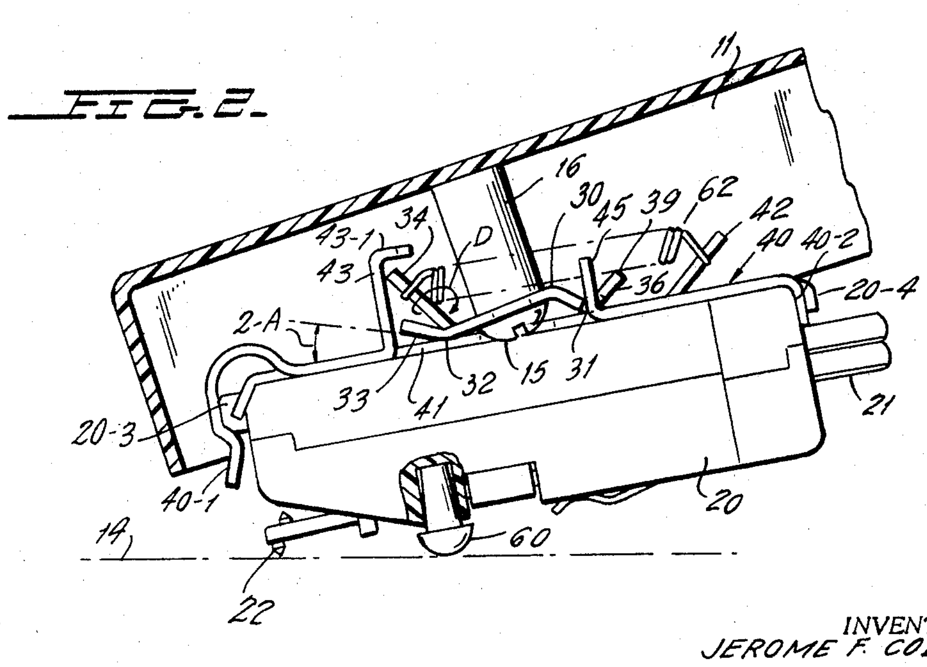
FIG. 2 shows the cartridge of FIG. 1 after it has pivoted toward its retracted position about its first pivot axis and is about to commence further retraction movement about the second pivot axis.
Figure 3:
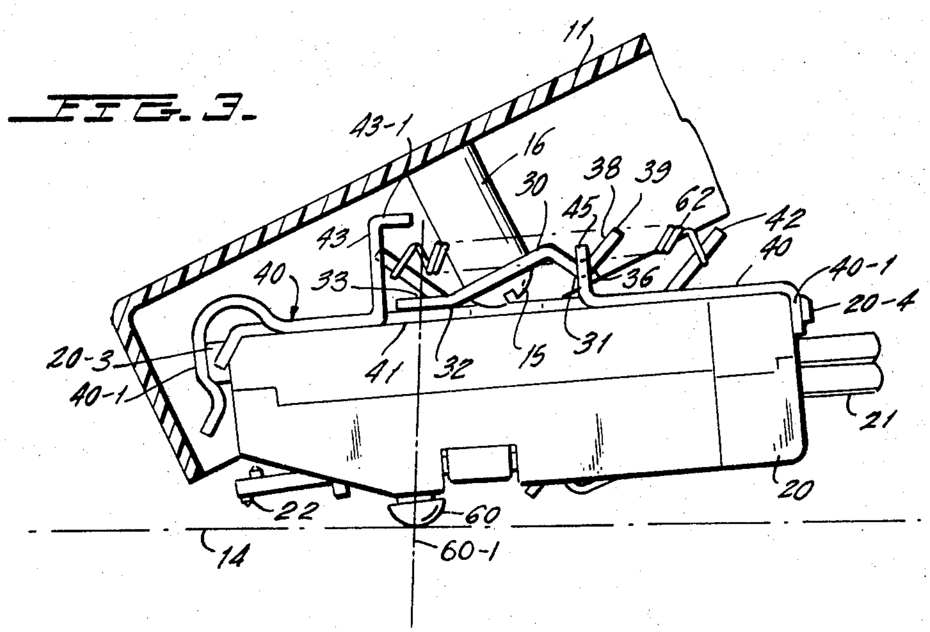
FIG. 3 shows the cartridge of FIG. 1 after it has completed its second pivotal retraction movement about its second pivot axis.
Figure 9:
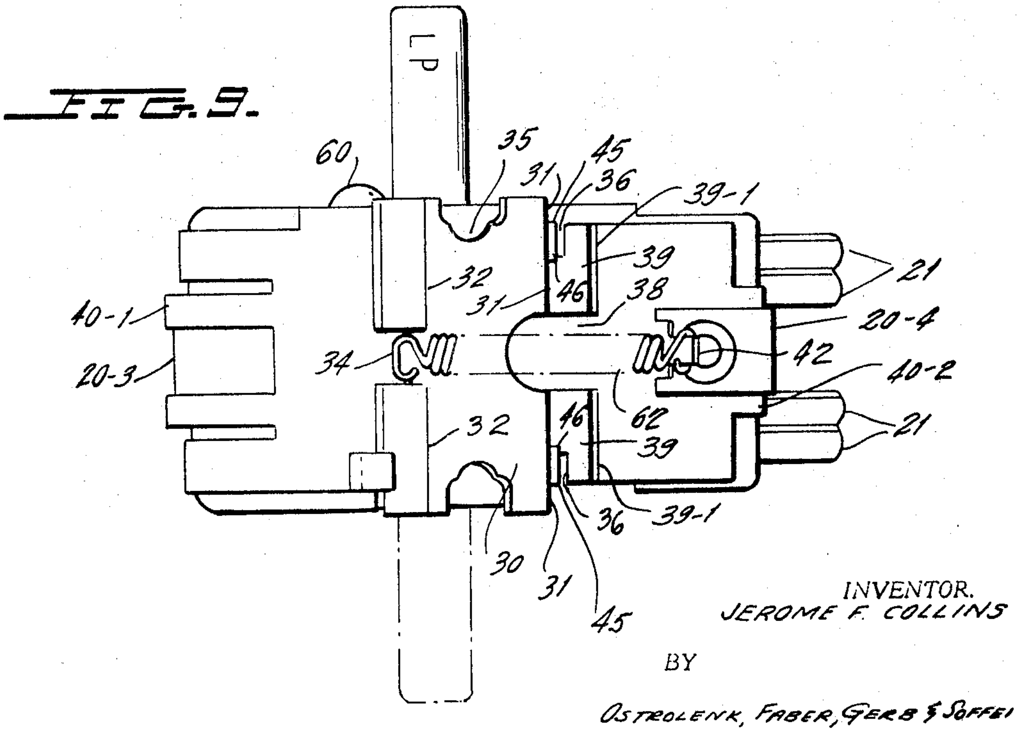
FIG. 9 is a top plan view of a retraction means and the cartridge shown in FIGS. 1 to 3.
Figure 4:
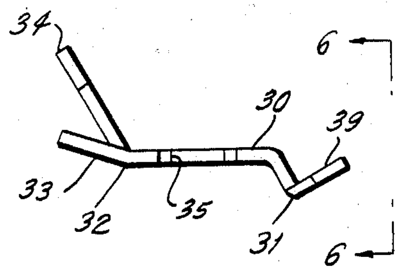
FIG. 4 is a side view of the second pivotal cartridge support of the retraction means of FIGS. 1 to 3.
Figure 6:
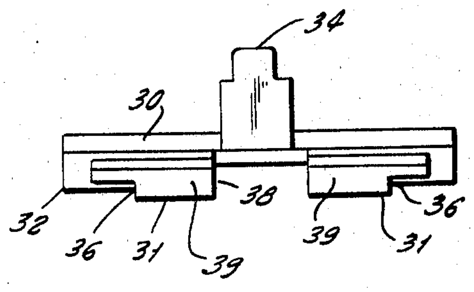
FIG. 6 is a view in the direction 6—6 of FIG. 4.
Figure 5:
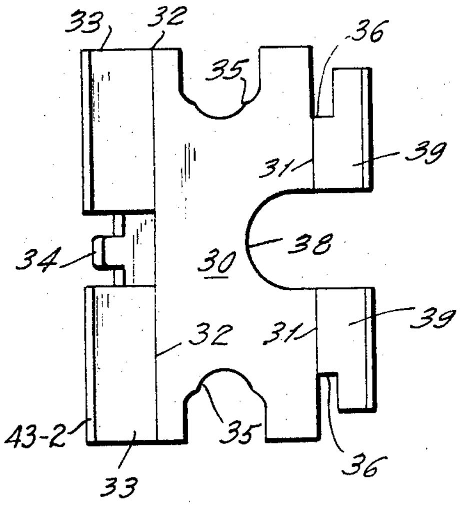
FIG. 5 is a plan view of the support member element shown in FIG. 4.
Figure 8:
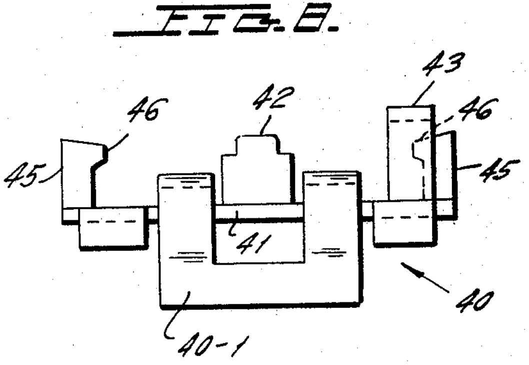
FIG. 8 is a view of the first support member in the direction 8—8 of FIG. 7.
Figure 7:
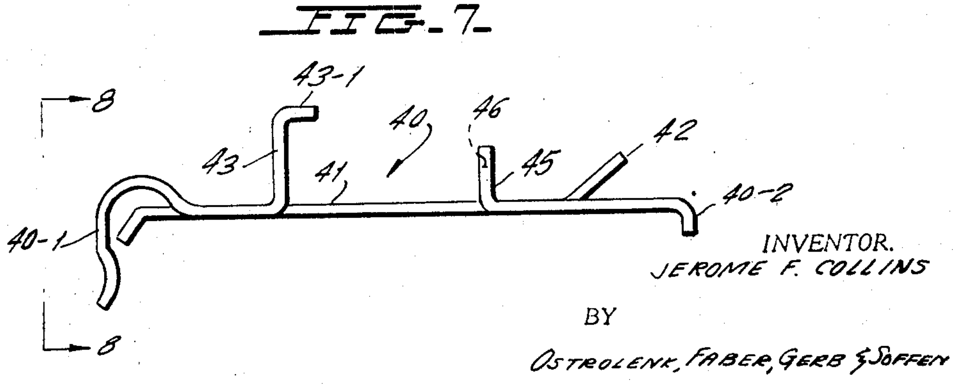
FIG. 7 is a side view of a part of the cartridge wall or of the first support member sheet element attached thereto and cooperating with the pivotal support retraction means of FIGS. 1 to 3.

In accordance with the invention, a double-pivot bracket support member 30, herein also called "second support member," affixed as by two screws 15 to tone arm posts 16, carries the cartridge 20 for pivotal motion about two support-pivot axes 31, 32 from the normal cartridge position of FIG. 1 by angle 1–A to an initially retracted position of FIG. 2 and therefrom by an additional angle 2–A to the fully retracted position of FIG. 3. The first bracket support member 30 shown in detail in FIGS. 4–6 may be formed of strong sheet metal, such as steel.

A suitable elastically deformable bias means element 62 shown as a helical metallic tension spring 62 is connected between the pivotal cartridge support 30 and a portion of the cartridge wall for normally holding the cartridge on the tone arm in the record playing position of FIG. 1 wherein the stylus 22 engages the groove-undulations of the record. In the example shown, one end of the stretched spring 62 is attached to a central tongue 34 of second pivotal support member 30 and the opposite spring end is attached to a central tongue 42 of the first cartridge support member or sheet 40 which may be considered an integral part of the upper wall of the cartridge casing. In the example shown, first cartridge support member sheet 40 has aligned flat front and rear sheet sections terminating in elastically deformable front and rear tongues 40–1 and 40–2 having openings which are seated over and are interlocked in the sheet affixing position shown by front and rear cartridge-interlocking projections 20–3 and 20–4, respectively.

A conventional record abutment 60 of solid elastic material has a smooth shank of a cylindrical or slightly tapered-toward-inward-end shape which is forced with a tight affixing fit into a housing recess (FIG. 2). The abutment member 60 may be of plastic or metal, for instance, and has a smooth rounded end surface normally spaced from the record surface 14 so that normally only the stylus 22 is in groove-engaging operative position. However, when the tone arm 11 is depressed by abnormal forces, the abutment member 60 comes into engagement with the record surface 14 and moves the cartridge with the stylus in a retracting direction indicated by arrow B in FIG. 1.

Cartridge-double-pivot second support sheet member 30 engages with its first pivot axis portion 31 guide tongues 45 transversely projecting from first cartridge support member sheet 40. The second support member sheet 30 is sufficiently large and wide for assuring that its two support pivot portions which constitute its first pivot axis 31 shall pivotally engage the first cartridge support sheet member 40 adjoining the roots or junction of its guide tongues 45 when the cartridge 20 is pivoted on the first pivot axis 31 over the initial retraction angle 1–A. The first cartridge support member sheet 40 and its transverse guide tongues 45 are also proportioned and arranged to assure that when the cartridge 20 is subjected to the further retraction step on pivot axis 32 through second retraction angle 2–A, the regions of the first pivot axis 31 of second double-pivot support member 30 slide on guide tongues 45 from their downward pivoting position seen in FIGS. 1 and 2 to displaced raised pivot positions such as seen in FIG. 3.

When depressing forces are applied toward the record 14 in direction A on tone arm 11, were cartridge 20 fixedly mounted in tone arm 11, the force pressure would be directly transmitted to stylus 22 of cartridge 20 and the record might be damaged. Instead, in accordance with the invention, as the abutment 60 becomes engaged with the record surface 14 it is subjected to axial forces causing cartridge retraction. The initial retraction forces caused by the engagement of abutment 60 with the record causes the cartridge 20 to first pivot in general direction B by first retraction angle 1–A around first pivot axis 31 of second cartridge support member 30. At the end of this initial retraction motion, second support pivot axis 32 of second support member 30 engages the cartridge wall support sheet 40 and stops further rotation of the cartridge about first support axis 31.

After completion of initial cartridge rotation through first angle 1–A, secondary support pivot axis 32 of second cartridge support member 30 now contacts the surface of cartridge 20 or its support sheet 40. On further downward tone arm depression in direction A, the abutment 60 causes further rotation of the cartridge 20 about second support pivot axis 32 by further retraction angle 2–A to its retracted end position of FIG. 3.

Elastic bias spring 62 opposes the double retraction motion of cartridge 20 about the two pivot axes 31 and 32 of its second support member 30. Upon removal of tone-arm-depressing forces, tension spring 62 pulls cartridge 20 back to normal playing position of FIG. 1.

Rotation of cartridge 20 toward the record surface beyond the normal playing position of FIG. 1 is prevented by transverse stop hook 43–1 engaging and stopping end region 43–2 of second support member 30.

Accidental separation of the bracket support member 30 from cartridge 20 or its mounting member or sheet 40 is prevented by transverse stop portion 46 of the two control or guide members 45 of the first cartridge support sheet member 40 which prevent the rear end 36 of second support member 30 from slipping out therefrom (FIG. 3) and the transverse stop hook 43–1 of stop member 43, which prevents the slipping out of the opposite end 33.

Refer to FIG. 3. Once cartridge 20 has been retracted through both angles 1–A and 2–A, the flat surface 33 of the second pivotal support sheet member 30 engages the cooperating surface 41 of the cartridge wall support sheet member 40 which prevents further pivoting of cartridge 20 and determines the retracted cartridge end position seen in FIG. 3.

In accordance with the invention, the second cartridge pivot axis or point 32 of the second cartridge support member is considerably closer to the abutment axis 60–1 than the first cartridge pivot axis or point 31 thereof. At such closer spaced second-pivot axis 32, engagement with the first cartridge support wall 40 (FIG. 2), even a very small further tone-arm depression causes abutment 60 to rotate the cartridge about a further second large retraction angle 2–A and greatly increases stylus-to-record spacing.

Abutment member 60 has a rounded smooth outer surface. Thus, abutment member 60 may have its outer surface shaped as a portion of a sphere or as a portion of a cylinder, the axis of the cylinder running parallel to the pivot axes 31 and 32. Because abutment member 60 has a rounded outer surface, it is enabled to roll and slide over the surface of record 14 as cartridge 20 pivots between normal and retracted positions. Abutment member 60 should have a sufficiently large end surface so that when its surface contacts the surface of the record 14, it will not be pressed into any of the record grooves.

There is no mandatory position or height for the abutment member 60, although there is a range of optimum positions and heights therefor. Abutment member 60 should be so positioned and of such height that it should meet the following requirements: (a) It should clear and space from the surface of the record every time the stylus 22 is subjected to undulations in the groove of the record. (b) It should contact the surface of the record under disturbing tone-arm depressing forces at the desired start of the first cartridge retraction motion on pivot axis 31 over the first angle 1–A. (c) It should thereafter pivot the cartridge 20 on secondary support pivot 32 by the further retraction angle 2–A under continuing tone-arm depressing forces.

Because of the relatively large cartridge retraction motion around second support pivot 32 under small additional tone arm depressing forces, it is not necessary that abutment member 60 be precisely height adjustable to obtain proper retraction of the cartridge 20 to the desired minimum stylus-to-record spacing such as shown in FIG. 3. Hence, the abutment member 60 can be a permanent molded portion in a fixed position on the cartridge casing and need not have to be precisely adjusted as in the prior art retractable cartridge mechanism.

Once the cartridge has rotated to the retraction end position shown in FIG. 3, it will no longer rotate under additional pressure being exerted on the tone arm 11. However, no harm will befall the grooves of record 14 as a result of excessive pressure being exerted on tone arm 11 because stylus 22 will have already been retracted by the desired minimum spacing off the surface of the record 14.

I have just described a novel phonograph record player cartridge retractor means which, by employing a cartridge support having first and second retraction pivot axes, assures minimum retraction spacing of stylus 22 from the record surface 14 without requiring precise height adjustment of the cartridge abument member 60.

Refer to FIGS. 4, 5, 6 and 8 wherein the second double-pivot cartridge support member 30 of the novel cartridge retraction means of the instant invention is shown. Support member element 30 may be stamped from a single sheet of sturdy material, e.g., steel. Cutouts 35 provide openings for screws 15 which affix the cartridge 20 to the tone arm posts 16.

Cartridge-double-pivot support member sheet 30 has two cutouts or slits 36 which receive upstanding guide tongues 45 of cartridge wall sheet 40. The support-sheet slits 36 are sufficiently deep and wide for assuring that the first pivot axis portions 31 of second cartridge support member 30 shall pivotally engage the cartridge sheet 40 adjoining the roots or junctions of its guide tongues 45 when the cartridge 20 is pivoted on the first pivot axis 31 over the initial retraction angle 1–A. When the cartridge 20 is subjected to the further retraction step about pivot axis 32 the rightward first pivot axis 31 of second support member 30 moves on guide tongue 45 from its junction with first support sheet member 40. As this first pivot axis 31 of second support member 30 separates from this junction of tongue 45 with first sheet member 40, the upward sliding movement of this first pivot axis 31 is guided by engagement of slots 36 of second support member 30 with the guide tongues 45 of first support member 40 from its lower position of FIGS. 1 and 2 to its raised position of FIG. 3. The rear slot 38 of double pivot support member 30 provides clearance for the motion of the biasing spring 62 when the cartridge 20 is pivoted from the normal position of FIG. 1 to its end-retraction position of FIG. 3 in which spring 62 has entered and is within slot 38. One end of biasing spring 62 is affixed to central tongue projection 34 of double pivot support sheet member 30 and the opposite spring end is affixed to a central tongue projection 42 of cartridge wall sheet member 40 (FIGS. 1 to 8).

The front stop projection 43 with its stop portion 43–1 of cartridge wall sheet 40 serves to fix the normal operating position of cartridge support 30 and of the cartridge 20 with its stylus 32 seen in FIG. 1 in which it is held by biasing tension spring 62.

The double-pivot phonograph cartridge retraction mechanism of the invention described above for securing large stylus-to-record stylus displacement under adverse conditions will suggest other modifications thereof.

Figures 10, 11, 12:
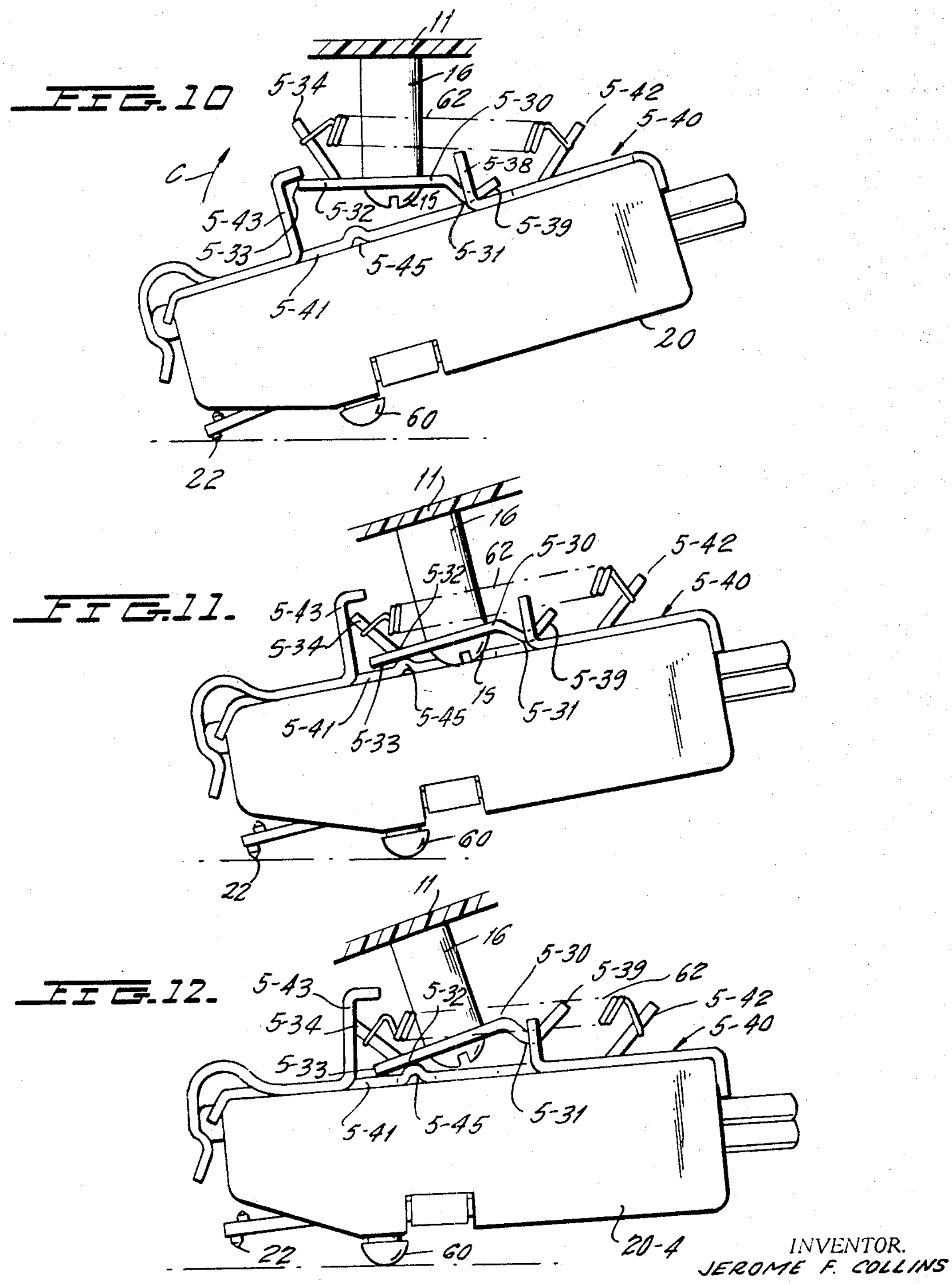
FIGS. 10, 11 and 12 have views similar to FIGS. 1 to 3 of a modified form of cartridge retraction mechanism of the invention.

FIGS. 10, 11 and 12 show an example of such modified double-pivot cartridge mechanism of the invention. FIG. 10 (corresponding to FIG. 1) shows the mechanism in normal condition wherein it holds the stylus in record-groove-engaging position. FIG. 11 (corresponding to FIG. 2) shows the mechanism after the cartridge was pivoted or rotated over the first retraction angle 1–A. FIG. 12 (corresponding to FIG. 3) shows the mechanism after the cartridge was rotated over the second retraction angle 2–A to the final retracted cartridge positions.

The retraction mechanism of FIGS. 10 to 12 embodies component cooperating parts identical with those described in connection with FIGS. 1, 2 and 3 except for the differences explained below. Its cartridge support member 5–30 does not have the second pivot axis bend 30 of that in FIG. 1, and its front section 5–32 is aligned in the main plane of support member 5–30. However, a planar portion of support member 5–30, which forms its second pivot axis 5–32, comes into pivotal engagement with a pivot projection 5–43 of cartridge wall sheet member 40 and extending over the width of the overlying second support member sheet 5–30 (see FIGS. 4 to 7). After being rotated on its first pivot axis 5–31 by the initial retraction angle 1–A to the position of FIG. 11, second pivot axis 5–32 of support 5–30 establishes engagement with cartridge-wall-sheet pivot projection 5–43. Thereupon—under conditions similar to those described in connection with FIG. 3 the tone-arm depressing forces cause the cartridge to be tilted along the second support pivot axis 5–32 engagement with wall pivot projection 5–43 over the second retraction angle 2–A to the final cartridge retracted position of FIG. 12 (corresponding to that of FIG. 3).

The principles underlying the invention described in connection with specific exemplifications will suggest other modifications thereof.

I claim:

1. In combination with a phonograph record player having a pivotally supported tone arm transversely movable over record grooves of a facing phonograph record of a cartridge carried by the tone arm along an elongated axis over the record surface and having transducer means and a cooperating stylus at the front end of the cartridge arranged to engage and be undulated by record-groove undulations to cause said transducer means to generate corresponding signals, said cartridge having an abutment member extending along an abutment axis transverse to the record surface, said abutment member having an abutment surface normally spaced from said record surface and movable into engagement with the record surface upon the application of excessive tone-arm depressing forces, a cartridge carrying retraction mechanism connected intermediate said tone arm and cartridge comprising a first cartridge support member which is part of and secured to said cartridge, and a second support member including a mounting portion affixable to said tone arm, each of said two support members having a longitudinal direction extending generally in the same direction as said longitudinal axis, said first and second support members pivotally interconnected, with said second support member having first and second pivotal axes each transverse to said longitudinal direction and longitudinally spaced from each other and rearwardly from said abutment axis for successively pivoting said cartridge by said abutment member on said axes toward said tone arm under excessive tone arm depressing forces, said second pivot axis being nearer to said abutment axis than said first pivot axis, and elastic bias means connected between said first and second support members for normally causing said two support members to engage each other along said first pivot axis and maintain said stylus in a normal groove-engaging position, said excessive tone-arm depressing forces causing the record-engaging abutment member to successively pivot said first support member and the cartridge about said first pivot axis through a first retraction angle and thereafter about said second pivot axis through a second further retraction angle, and successively lift said cartridge stylus by corresponding first and second spacings from said groove-engaging stylus position to retraction stylus positions successively nearer to said tone arm, a guiding element extending from said first support member and said first axis of said second support member engaging and slidable on said guiding element between a first guide position at the junction between said guiding element and said first support member wherein said second support member engages with said first pivot axis said junction and the cartridge is tilted about said first pivot axis through said first retraction angle, and a second guide position spaced from said junction position wherein said second support member engages with said second pivot axis a second seat element of said first supporting member spaced nearer said abutment axis than said junction and the cartridge is tilted about said second pivot axis through said second retraction angle, said first pivot axis of said first support member being moved on said guiding element between said junction position to said second guide position by said abutment member after tilting said second support member over said first pivot axis through the full first retraction angle, said tilting of the cartridge through said first and second retraction angles causing said stylus to be lifted by said two spacings from said record while said abutment member is held in a fixed position on said cartridge.

2. In a phonograph-cartridge retraction mechanism as claimed in claim 1, a guiding projection extending from said first cartridge support member toward the tone arm constituting said guiding element, said second support member having said guided support element movable along said guiding projection between said first guide position wherein the cartridge is tilted through said first retraction angle about said first support pivot axis and said second guide position wherein said cartridge is tilted through said second retraction angle about said second support pivot axis, and compensates for variations in the required total stylus lift-off spacing from the record while said abutment surface is held in a fixed position on said cartridge.

References Cited

UNITED STATES PATENTS

| | | | |
|---|---|---|---|
| 3,224,783 | 12/1965 | Wiggins et al. | 274—24 |
| 3,173,692 | 3/1965 | Van Antwerp. | |
| 3,074,726 | 1/1963 | Sioles et al. | |
| 2,582,948 | 1/1952 | Cairnes. | |
| 2,475,785 | 7/1949 | Jensen. | |

LEONARD FORMAN, Primary Examiner

F. J. D'AMBROSIO, Assistant Examiner